United States Patent [19]
Bartusek et al.

[11] 3,746,143
[45] July 17, 1973

[54] DRIVE TRANSMISSION MEANS
[75] Inventors: Robert Joseph Bartusek, Des Moines, Iowa; Elmer Richard Eckert, Horicon, Wis.
[73] Assignee: Deere & Company, Moline, Ill.
[22] Filed: Aug. 13, 1971
[21] Appl. No.: 171,565

[52] U.S. Cl. .................................. 198/88, 198/91
[51] Int. Cl. ............................................. B65g 37/00
[58] Field of Search ..................... 198/98, 203, 213, 198/91; 74/219 R

[56] References Cited
UNITED STATES PATENTS
| | | | |
|---|---|---|---|
| 3,198,314 | 8/1965 | Duram | 198/88 |
| 3,108,488 | 10/1963 | Huszar | 74/229 X |
| 3,270,863 | 9/1966 | Ackles | 198/203 |

*Primary Examiner*—Harvey C. Hornsby
*Assistant Examiner*—Douglas D. Watts
*Attorney*—H. Vincent Harsha, William A. Murray et al.

[57] ABSTRACT

A mechanism for transmitting power across a pivotal connection between two conveyor sections, including a guide member connected to one of the sections and having a circular outer surface formed about the axis of the pivotal connection, a continuous length of roller chain encircling the guide member and having inner and outer sides relative thereto, the rollers of said chain being in rolling engagement with the surface of the guide member throughout substantially the entire length of the chain, a first sprocket drivingly connected to one of the conveyor sections and in driving engagement with the outer side of the chain, and a second sprocket drivingly connected to the other conveyor section and also in driving engagement with the outer side of the chain.

17 Claims, 3 Drawing Figures

Patented July 17, 1973 3,746,143

INVENTORS
R. J. BARTUSEK
E. R. ECKERT

BY

John O. Hayes
ATTORNEY

DRIVE TRANSMISSION MEANS

BACKGROUND OF THE INVENTION

The present invention relates generally to a chain-type power-transmitting apparatus, and more particularly to apparatus for transmitting power across a pivotal connection between two power-driven elements. The invention has particular utility for transmitting power between two pivotally-connected, communicating, material-conveyor sections.

Material conveyors comprising a pair of communicating, relatively pivotal auger conveyor sections are well-known in the art and widely used for conveying grain and various comminuted materials. A common arrangement of such conveyors is one wherein the first section extends vertically from the discharge point of a tank, bin, or other material container, and the second section communicates with and is pivotally connected to the upper end of the first section. In typical, commercially available apparatus of this type, the first section is pivotal relative to the material container about its vertical axis and the second section is pivotal relative to the first section about an axis lateral to the axis of the first section, such that the discharge point of the conveyor can be adjusted to various positions.

The mechanism employed in such apparatus for driving the two auger sections has been a problem in the past. One common, though relatively expensive solution to this problem, has been to provide a separate hydraulic motor unit to drive each section individually. It is economically preferable, however, to provide only a single drive unit for the first auger section, and to transmit the drive from the first section to the second section across the pivotal connection therebetween. Various means have been developed for transmitting power across the pivotal connection, representative of which is the mechanism disclosed in U.S. Pat. No. 3,198,314, issued 3 Aug. 1965 to Duram. The Duram mechanism comprises, generally, a ring encircling and rotatably mounted on a tubular housing interconnecting a pair of auger conveyor sections, the ring having two sets of sprocket teeth; a first sprocket supported on and driven by the first auger section, the sprocket in turn driving the ring by means of a drive chain interconnecting the sprocket with one of the sets of teeth thereon; and a second sprocket supported on and drivingly connected to the second auger section, the second sprocket being driven by the ring through a second drive chain interconnecting the sprocket with the other set of teeth.

SUMMARY OF THE INVENTION

It is the primary object of the present invention to provide a mechanism for transmitting power between two relatively pivotal elements, the mechanism having a simpler and more economical construction than that of similar devices heretofore known. More particularly, it is an object to provide such a mechanism which utilizes only a single, continuous length of chain as the intermediate power-transmitting element. It is a further object to provide such a mechanism in which the chain is of the roller type, the chain encircling a circular support on one of the auger sections and the rollers thereof serving as bearing means between the chain and support.

The invention comprises, generally, a pair of conveyor sections connected for relative pivotal movement about an axis, the axis passing through a tubular housing interconnecting the two sections. A circular guide member is mounted on and encircles the housing. A continuous length of roller chain encircles the guide member, the rollers of the chain engaging the surface of the guide member throughout substantially the entire length of the chain and acting as bearing means between the chain and guide. A first sprocket, supported on and driven by one of the conveyor sections, is in driving engagement with the outer side of the chain and is operable to drive the chain around the stationary guide member in response to operation of the conveyor section. A second sprocket is supported on and drivingly connected to the other conveyor section, the second sprocket also being drivingly engaged with the outer side of the chain and thus operable to drive the second conveyor section in response to movement of the chain around the guide.

BRIEF DESCRIPTION OF THE DRAWINGS

The preferred embodiment of the present invention will be described in conjunction with the accompanying drawings in which.

DESCRIPTION OF THE PREFERRED EMBODIMENT

Figure 1:
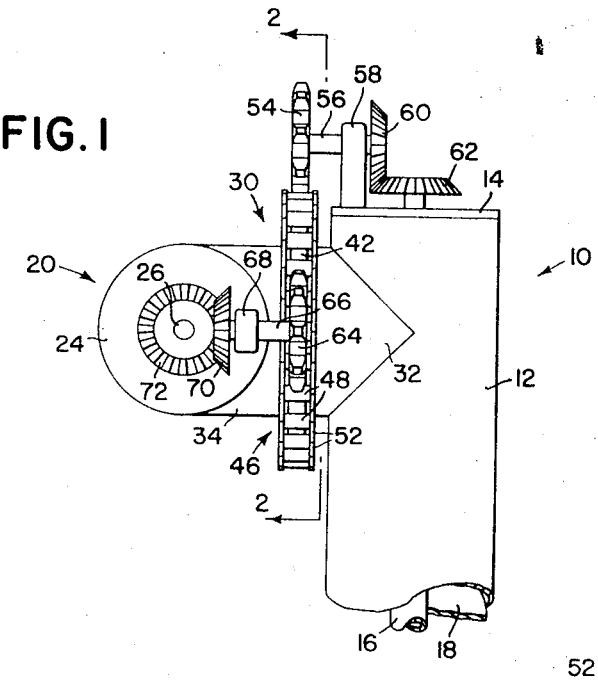
FIG. 1 is an elevation view of a pair of relatively pivotal conveyor sections drivingly interconnected by apparatus constructed in accordance with the principles of the invention.

The illustrated embodiment of the invention includes a first auger conveyor section indicated generally by the numeral 10 and including a tubular housing 12 enclosed at one end by a circular cap 14, a shaft 16 disposed concentrically within the housing 12 and rotatably supported at its upper end in the cap 14, and spiral flighting 18 fixed along its inner edge to the shaft 16. Pivotally connected to the conveyor section 10 is a second, similar auger conveyor section indicated generally by the numeral 20 and including a tubular housing 22 enclosed by a cap 24, a shaft 26 disposed concentrically in the housing 22 and rotatably supported at one end in the cap 24, and spiral flighting 28 fixed along its inner edge to the shaft 26.

The sections 10 and 20 are interconnected for relative pivotal movement about an axis normal to and intersecting the axes of the sections by means of a lateral, tubular housing 30 centered on the pivotal axis and comprising a first portion 32 fixed to and communicating with the housing 12, and a second portion 34 fixed to and communicating with the housing 22. The open ends of the portions 32 and 34 are rotatably joined in communicating relation by means of the structure illustrated in detail in FIG. 3. As shown therein, the open outer end of the portion 34 is provided with a flange 36, and the open outer end of the portion 32 is provided with a flange 38 spaced inwardly of its outer edge. A plurality of nut-and-bolt assemblies 40 pass through aligned apertures in the flange 38, a circular guide member or spacer 42, and a circular plate 44 extending inwardly of the outer edge of the flange 36. The flange 36 is thus constrained to rotate within the annular groove formed by the guide 42 and plate 44, and the auger section 20 is thus connected to the section 10 for relative pivotal movement about the axis of the housing 30.

Figures 2, 3:
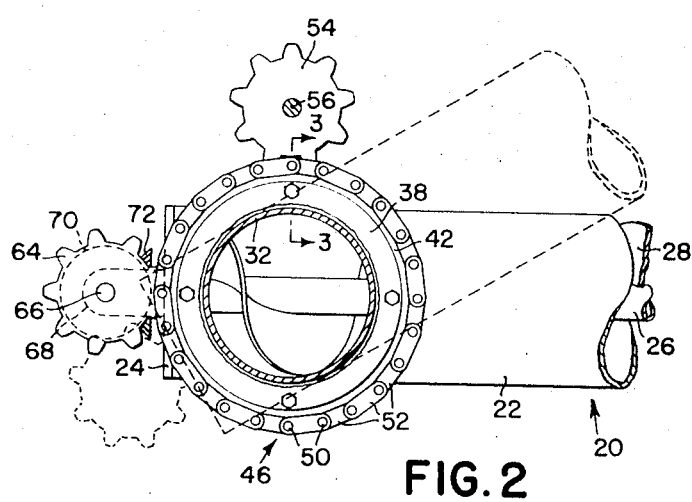
FIG. 2 is a sectional view taken along the line 2—2 of FIG. 1.
FIG. 3 is an enlarged sectional view taken along the line 3—3 of FIG. 2.

Encircling the circular guide member 42 is a continuous length of conventional roller chain 46 comprising a plurality of rollers 48 carried on pins 50, the latter being connected by links 52. The inner side of the chain is in close proximity to the guide 42, the rollers 48 being in rolling engagement with the outer surface of the guide throughout substantially the entire length of the chain 46. The rollers 48 thus serve as bearing means between the chain and guide. As illustrated in FIG. 3, the inner edges of the links 52 extend inwardly of the outer surface of the guide 42 and thus act to retain the chain in position on the guide.

In driving engagement with the outer side of the roller chain 46 is a sprocket 54 fixed to the outer end of a shaft 56 rotatably supported by a bearing 58 fixed to the cap 14. Mounted on the inner end of the shaft 56 is a bevel gear 60 in mesh with a similar bevel gear 62 on the upper end of the auger shaft 16. In a similar manner, a sprocket 64, fixed to the end of a shaft 66, is in driving engagement with the outer side of the chain 46 at a point spaced from the sprocket 54. The shaft 66 is supported in a bearing member 68 fixed to the cap 24 and has a bevel gear 70 on its inner end in mesh with a bevel gear 72 on the end of the auger shaft 26.

In a typical application of the disclosed device, the auger shaft 16 is driven at its lower end, and the lower portion of the housing 12 includes an inlet opening communicating with the discharge opening of a material receptacle. The auger flighting 18 is thus operable to advance material upwardly 18 is the housing 12. Although not shown in the drawings, the upper end of the flighting 18 preferably includes a radially extending paddle which is operable to discharge the material reaching the upper end of the housing laterally through the tubular connecting portion 30 and into the end of the auger section 20. There, the material is picked up by the flighting 28 and advanced toward a discharge opening on the outer end of the housing 22.

Power for driving the auger shaft 26 in the section 20 is transmitted from the bevel gear 62 on the auger shaft 16 to the gear 60 on the shaft 56. The sprocket 54 on the shaft 56 is thus operable to move the chain 46 around the surface of the guide 42, and the chain, in turn, is operable to drive the sprocket 64. The sprocket 64 drives the bevel gear 70 on the shaft 66 which, in turn, drives the bevel gear 72 on the auger shaft 26 to complete the drive train. As illustrated in phantom in FIG. 2, the auger section 20 may be pivoted about the axis passing through the tubular connecting portion 30 without interrupting the drive.

We claim:

1. Conveyor apparatus comprising: a pair of communicating conveyor sections; means connecting said conveyor sections for relative pivotal movement about an axis; circular support means rigidly fixed to one of said conveyors sections and centered on said axis; a continuous length of roller chain encircling said circular support means, the rollers of said chain being in rolling engagement with said support means; a drive sprocket in driving engagement with said chain, said drive sprocket being rotatably supported on and drivingly connected to one of said conveyor sections; and a driven sprocket in driving engagement with said chain, said driven sprocket being rotatably supported on and drivingly connected to the other of said conveyor sections, the drive sprocket being operative to drive the chain around the support means and the driven sprocket being driven by the chain as the chain is driven around the support means.

2. The invention defined in claim 1 wherein said continuous length of roller chain has inner and outer sides relative to said circular support means, said inner side of said chain is in close proximity to said circular support means substantially throughout the entire length of said chain, and both of said sprockets are in driving engagement with the outer side of said chain.

3. The invention defined in claim 1 including tubular housing means extending between and communicating with each of said conveyor sections, said circular support means encircling said housing means.

4. The invention defined in claim 3 wherein said tubular housing means comprises a first tubular portion fixed to and communicating with said first conveyor section, a second tubular portion fixed to and communicating with said second conveyor section, and means interconnecting said first and second tubular portions for relative movement about said axis.

5. In combination with a pair of elements having drivable means, said elements being connected for relative pivotal movement about an axis, means for drivingly connecting said drivable means across said pivotal connection comprising: support means rigidly fixed to one of said elements and having an arcuate surface formed about said axis; a continuous length of roller chain encircling said support means, the rollers of said chain being in rolling engagement with the arcuate surface of said support means; a drive sprocket in driving engagement with said chain, said drive sprocket being rotatably supported on one of said elements and drivingly connected to the drivable means thereof; and a driven sprocket in driving engagement with said chain, said driven sprocket being rotatably supported on the other of said elements and drivingly connected to the drivable means thereof, the drive sprocket being operative to drive the chain around the support means and the driven sprocket being driven by the chain as the chain is driven around the support means.

6. The invention defined in claim 5 wherein said continuous length of roller chain has inner and outer sides relative to the arcuate surface of said support means, and wherein at least one of said sprockets is in driving engagement with the outer side of said chain.

7. The invention defined in claim 6 wherein both of said sprockets are in driving engagement with the outer side of said chain.

8. Conveyor apparatus comprising: a first auger conveyor section including a tubular housing having an auger section rotatably supported therein; a second auger conveyor section including a tubular housing communicating with the housing of said first auger conveyor section and having an auger section rotatably supported therein, said second auger conveyor section being connected to said first auger conveyor section for relative pivotal movement about an axis; guide means rigidly fixed to one of said auger conveyor sections and having a circular outer surface formed about said axis; a continuous length of roller chain encircling said guide means and having inner and outer sides relative thereto, the rollers of said chain being in rolling engagement with the circular outer surface of said guide means and the inner side of said chain being in close proximity to the surface of said guide means throughout substantially its entire length; a drive sprocket in driving engagement with the outer side of said chain, said drive sprocket being supported on said first auger conveyor section and drivingly connected to the auger section thereof; and a driven sprocket in driving engagement with the outer side of said chain, said driven sprocket being supported on said second auger conveyor section and drivingly connected to the auger section thereof, the dirve sprocket being operative to drive the chain around the guide means and the driven sprocket being driven by the chain as the chain is driven around the support means.

9. The invention defined in claim 8 including tubular housing means extending between and communicating with the tubular housings of each auger conveyor section, said guide means encircling said tubular housing means.

10. The invention defined in claim 9 wherein said tubular housing means comprises a first tubular portion fixed to and communicating with the tubular housing of said first auger conveyor section a second tubular portion fixed to and communicating with the tubular housing of said second auger conveyor section, said second tubular portion also communicating with said first tubular portion, and means interconnecting said first and second tubular portions for relative pivotal movement about said axis.

11. The invention defined in claim 10 wherein said guide means is rigidly fixed to one of said tubular portions of said tubular housing means.

12. Conveyor apparatus comprising: a pair of communicating conveyor housings connected for relative pivotal movement about an axis forming an angle with each of the housings; drivable conveyor means in each of the housings; guide means fixed to one of the housings and having an arcuate surface formed about said axis; a drive sprocket and a driven sprocket both disposed in the same plane as the guide means, one of the sprockets being supported on each conveyor housing and drivingly connected to the conveyor means therein; a continuous length of roller chain encircling said arcuate guide means and having inner and outer sides relative thereto, the rollers of said chain being in rolling engagement on the inner side of said chain with said guide means, said sprockets being in driving engagement with said chain, the drive sprocket being operative to drive the chain around the guide means and the driven sprocket being driven by the chain as the chain is driven around the guide means, at least one of said sprockets being in driving engagement with the outer side of said chain.

13. The invention defined in claim 16 wherein at least one of said sprockets is drivingly engaged with the outer side of said chain at a point thereon at which the inner side of said chain is engaged with said arcuate guide means.

14. Conveyor apparatus comprising: a first conveyor housing having a tubular discharge portion formed about an axis; a first drivable conveyor element supported within said first conveyor housing; a second conveyor housing having a tubular inlet portion formed about an axis; a second drivable conveyor elemens supported within said second conveyor housing; means connecting said first and second conveyor housings with the tubular discharge and inlet portions thereof in axially aligned, end-to-end communicating relation and for relative pivotal movement of said housing about an axis coincident with the axes of the tubular portions; a guide member fixed to one of the tubular portions, said guide member lying in a plane perpendicular to the pivotal axis of the first and second conveyor housings and having an arcuate surface formed about said axis; a drive sprocket and a driven sprocket both disposed in the same plane as the guide member, one of the sprockets being supported on each conveyor housing and drivingly connected to the conveyor element supported therein; a continuous length ofroller chain encircling the arcuate surface of said guide member and having inner and outer sides relative thereto, the rollers of said chain being in rolling engagement on the inner side of the chain with said arcuate surface and said sprockets being in driving engagement with the chain, the drive sprocket being operative to drive the chain around the guide member and the driven sprocket being driven by the chain as the chain is driven around the guide member, at least one of the sprockets being in driving engagement with the outer side of the chain.

15. The invention defined in claim 14 wherein said guide member has an annular configuration and encircles one of the tubular portions said guide member having a circular outer surface formed about the pivotal axis of the first and second conveyor housings.

16. The invention defined in claim 15 wherein the rollers of the chain are in rolling engagement with the circular outer surface of the guide member throughout the entire length of the chain.

17. The invention defined in claim 16 wherein both of the sprockets are in driving engagement with the outer side of the chain.

* * * * *

UNITED STATES PATENT OFFICE
CERTIFICATE OF CORRECTION

Patent No. 3,746,143      Dated 17 July 1973

Inventor(s) Robert Joseph Bartusek and Elmer Richard Eckert

It is certified that error appears in the above-identified patent and that said Letters Patent are hereby corrected as shown below:

Column 5, line 10, change "dirve" to -- drive --; line 13, change "support" to -- guide --.

Column 6, line 2, change "16" to -- 12 --; line 12, change "elemens" to -- element --; line 17, change "housing" to -- housings --; line 27, change "ofroller" to -- of roller --.

Signed and sealed this 27th day of November 1973.

(SEAL)
Attest:

EDWARD M. FLETCHER, JR.
Attesting Officer

RENE D. TEGTMEYER
Acting Commissioner of Patents